United States Patent
Peel et al.

(10) Patent No.: US 6,359,260 B1
(45) Date of Patent: Mar. 19, 2002

(54) METHOD OF WELDING PANELS TOGETHER

(75) Inventors: James F Peel; Jerzy Styrnik, both of Brampton; Dale Best, Georgetown; Michael Roy, Brampton; Larry Weatherall, Honeywood, all of (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/650,582

(22) Filed: Aug. 30, 2000

(51) Int. Cl.[7] .............................................. B23K 9/007
(52) U.S. Cl. .................................. 219/137 R; 219/127
(58) Field of Search ........................... 219/137 R, 127; 228/165

(56) References Cited

U.S. PATENT DOCUMENTS

| | | | |
|---|---|---|---|
| 1,810,005 A | * 6/1931 | Burnish | 219/137 R |
| 3,062,950 A | * 11/1962 | Chyle | 219/127 |
| 3,436,521 A | * 4/1969 | Corrigan et al. | 219/137 R |
| 4,316,072 A | 2/1982 | Arnoldt | |
| 4,492,848 A | * 1/1985 | Strekalou et al. | 219/127 |
| 4,618,089 A | 10/1986 | Hanada et al. | |
| 4,656,329 A | 4/1987 | Moerke | |
| 4,954,689 A | * 9/1990 | Smith | 219/127 |
| 4,960,974 A | 10/1990 | Shigenaka | |
| 5,011,068 A | 4/1991 | Stoutenburg et al. | |
| 5,086,206 A | 2/1992 | Hansen | |
| 5,115,113 A | 5/1992 | Miller | |
| 5,141,093 A | 8/1992 | Alexander | |
| 5,380,978 A | 1/1995 | Pryor | |
| 5,646,364 A | * 7/1997 | Hodozuka et al. | 228/165 |
| 5,714,730 A | 2/1998 | Geiermann et al. | |
| 5,943,768 A | 8/1999 | Ray | |

* cited by examiner

Primary Examiner—Clifford C. Shaw
(74) Attorney, Agent, or Firm—Ralph E. Smith

(57) ABSTRACT

A method of welding in which an edge portion of a first panel is placed over an edge portion of a second panel, with an outer edge of the edge portion of the first panel adjacent to a shoulder of the second panel to provide a joint between the outer edge and the shoulder. Spot welds are applied to the panels along the joint by a bronze metal inert gas (MIG) welding gun. Pressure applied by a pressure applicator alongside the MIG welding gun presses the edge portions of the panels together during the spot welding. Linear MIG weld segments are then applied along the joint between the spot welds by the MIG welding gun to form a continuous line of MIG welding. The continuous line of MIG welding is polished to remove irregularities so that it blends evenly and smoothly with the panels.

7 Claims, 2 Drawing Sheets

METHOD OF WELDING PANELS TOGETHER

BACKGROUND OF THE INVENTION

This invention relates generally to welding and more particularly to a method of welding a roof panel to a rear quarter panel of an automotive vehicle.

BACKGROUND OF THE INVENTION

In a typical welding operation to secure the roof panel to the rear quarter panel of an automotive vehicle, it is customary to offset an edge portion of one of the panels to form a shoulder, place the other panel over the offset edge portion of the first panel with an edge of the second panel adjacent to the shoulder of the first panel to provide a joint, and then to apply resistance spot welds to the overlapping edge portions prior to applying a continuous weld along the joint by gas-metal arc welding sometimes referred to as metal inert gas (MIG) welding. MIG welding is a process in which the heat for welding is generated by an arc between a consumable electrode and the work metal. The electrode, a bare solid wire that is continuously fed to the weld area, becomes the filler material as it is consumed. The electrode, weld puddle, arc and adjacent areas of the base metal are protected from atmospheric contamination by a gaseous shield provided by a stream of gas, or mixture of gases, fed through the electrode holder. The gas shield must provide full protection, because even a small amount of entrained air can contaminate the weld deposit.

There are several problems with this method of securing the two panels together, relating particularly to the formation of resistance spot welds. A resistance spot welder has two electrodes with contact tips attached to each. These contact tips are closed onto the metal and pressure is applied usually by a pneumatic cylinder. Once the contact tips are closed onto the metal, a low voltage is applied which causes a high current to be generated due to the low resistance between the contact tips. This current melts the metal at the point of contact and a weld is produced. Under ideal conditions, any one of several problems can cause deficiencies in the spot welds.

These problems could be any one of, but not limited to, the following:

Incorrect voltage;
  Incorrect duration of time voltage is applied;
  Incorrect pressure applied;
  Misalignment of contact tips causing panel distortion;
  Contact tip wear;
  Contamination of a contact tip from sealer or paint;
  Indentation of the metal at the point of contact.

Any of these conditions will cause problems with the weld, but even a perfect resistance weld will leave a blemish on one or both outer surfaces of the metal being welded.

It has been proposed to simply eliminate the spot welding. However, this leaves the joint unsecured over its length as the continuous MIG weld is applied to the joint. The joint opens up forming a gap between the two overlapping panels into which the MIG weld material can seep resulting in high spots and low spots in the overlapping panels and requiring much additional work to form a finished joint.

The resistance spot welds must be made in the overlapping material at points spaced from the joint, in order for the welds to be formed correctly. If the weld is located on or close to the edge of one of the panels, metal is expelled from between the panels as the molten metal pool is formed. This expulsion of metal causes a very poor weld to be formed because most of the metal pool which would normally form the weld "nugget" on cooling is no longer present.

SUMMARY OF THE INVENTION

Resistance spot welds are not used in the present invention. Instead, MIG spot welds are applied at spaced points along the joint. In order to hold the overlapping panels tightly together, pressure is applied by a pressure applicator adjacent to each MIG spot weld as it is being formed. The pressure applicator moves along with the MIG welding gun to apply pressure during the formation of each MIG spot weld. After the panels are secured together by the MIG spot welds, linear MIG weld segments are applied between the spot welds to form a continuous line of MIG welding along the joint. The panels are held tightly together by the MIG spot welds during the application of the MIG weld segments so that welding material will not seep between the panels.

One object of this invention is to provide a method of welding having the foregoing features and capabilities.

Other objects, features and advantages of the invention will become more apparent as the following description proceeds, especially when considered with the accompanying claims and drawings.

DETAILED DESCRIPTION OF THE PREFERRED EMBODIMENT

Figure 1:
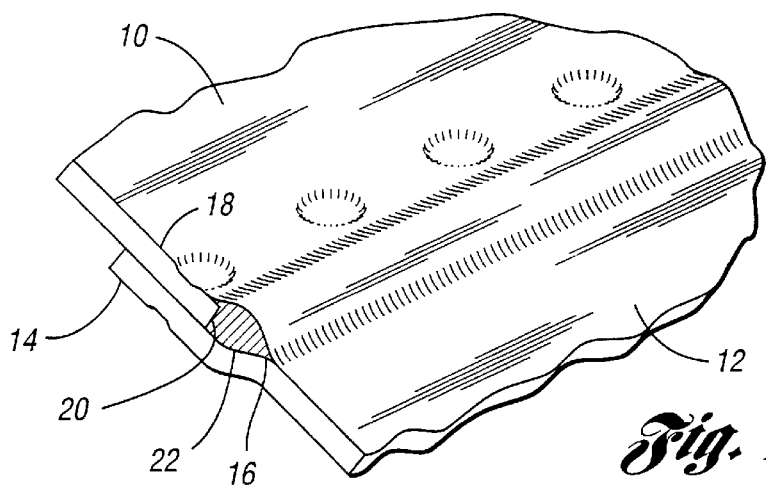
FIG. 1 is a fragmentary perspective view showing two panels connected together in accordance with a prior art method.

Referring now more particularly to the drawings, there is shown in FIG. 1 a metal panel 10 and a metal panel 12 which are secured together in accordance with a prior art method. The panel 10 may be considered the roof panel and the panel 12 the rear quarter panel of an automotive vehicle.

The panel 12 has an edge portion 14 which is offset from an adjacent inner portion of the panel 12 to form an elongated shoulder 16. The panel 10 has an edge portion 18 which overlaps the edge portion 14 of the panel 12 in a manner such that the outer edge 20 of the panel 10 is adjacent to the shoulder 16. The shoulder 16 and edge 20 form an elongated joint 22.

In accordance with the prior art method, the overlapping edge portions 14 and 18 are initially secured together by resistance spot welds 24 which are spaced from the outer edge 20 and are spaced apart in a line which parallels the joint 22. A continuous MIG weld is then applied along the length of the joint to secure the panels together. The spot welds are initially made in order to hold the panels in position while the MIG weld is being applied. However, the spot welds have the disadvantages referred to hereinabove.

Figure 2:
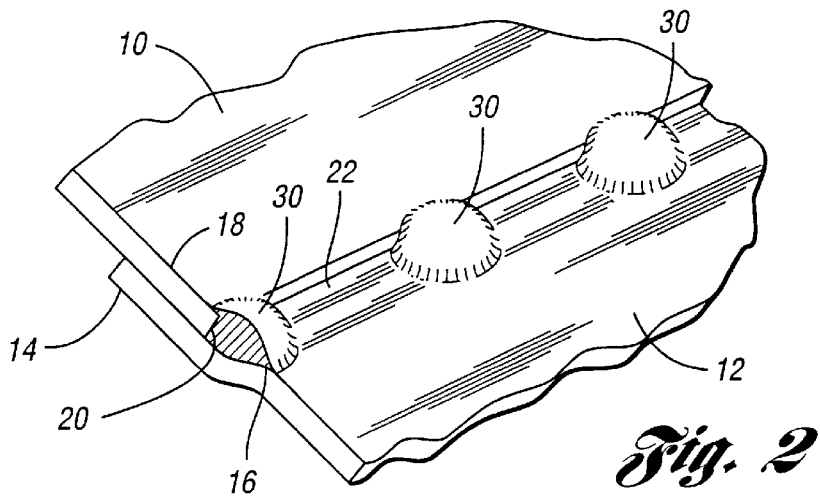
FIG. 2 is a fragmentary perspective view of two panels initially secured together by MIG spot welds along the joint between the panels, but before MIG weld segments have been applied between the MIG spot welds, in accordance with the method of this invention.
Figure 3:
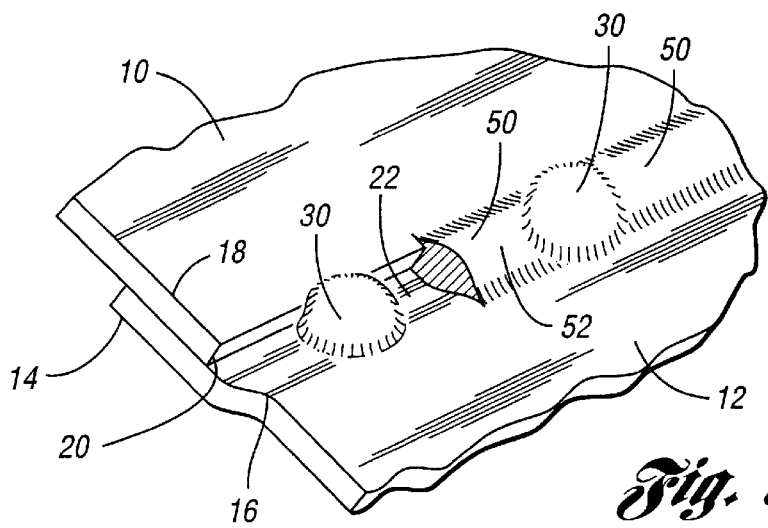
FIG. 3 is a fragmentary perspective view with parts broken away showing the two panels after the MIG weld segments have been applied to the joint between the spot welds.
Figure 4:
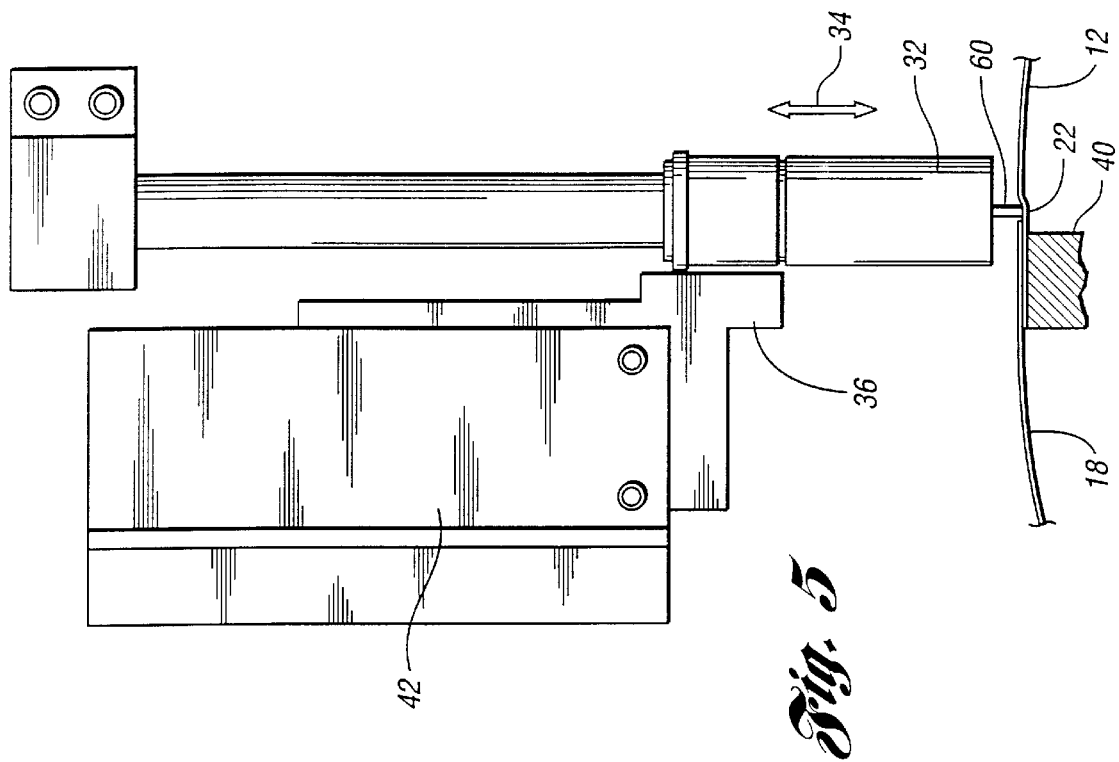
FIG. 4 is a fragmentary view showing a MIG welding gun applying a MIG spot weld to the joint between the panels, and also showing a pressure applicator applying pressure on the overlapping portions of the panels.

FIGS. 2–5 disclose the same panels 10 and 12, formed and overlapped in the same manner as in FIG. 1, but secured together in accordance with the method of this invention. In the method of this invention, resistance spot welds are not employed. Instead, MIG spot welds 30 are applied at spaced points along the joint 22 between the two panels (FIG. 2). This is in contrast to the prior art method in which resistance spot welds are made at points spaced from the joint between the panels. The MIG spot welds 30 are formed by a MIG welding gun 32 which is capable of being advanced and retracted in the direction of the arrows 34 in FIGS. 4 and 5 toward and away from the joint 22. When advanced, the MIG welding gun applies a spot of MIG weld material to the joint and when retracted it is moved lengthwise along the joint to the next point where a MIG spot weld is to be applied. Any suitable means may be provided for advancing and retracting the MIG welding gun 32 and for advancing it lengthwise along the joint from one spot weld location to another.

During the time that each MIG spot weld is applied to the joint, pressure is applied to the overlapping panel portions to preclude the development of a gap or it space between the overlapped edge portions of the panels. Pressure is applied by a pressure applicator 36 which is mounted alongside the MIG welding gun 32 for movement parallel to the movement of the MIG welding gun. In the advanced position (FIG. 4), the pressure applicator engages the edge portion 18 of the panel 10 and presses it down upon the edge portion 14 of the panel 12 against a backing or base plate 40 which supports the two panels. The pressure applicator 36 is capable of being advanced and retracted as by a suitable piston and cylinder assembly 42 controlled in any desired manner so that the pressure applicator 36 is always in its extended position during the application of the MIG spot welds. The pressure applicator 36 is moved with the MIG welding gun 32 from one spot weld location to the next and when the MIG welding gun is advanced to form a spot weld the pressure applicator is actuated to simultaneously apply pressure to the overlapping portions of the panels.

Figure 5:
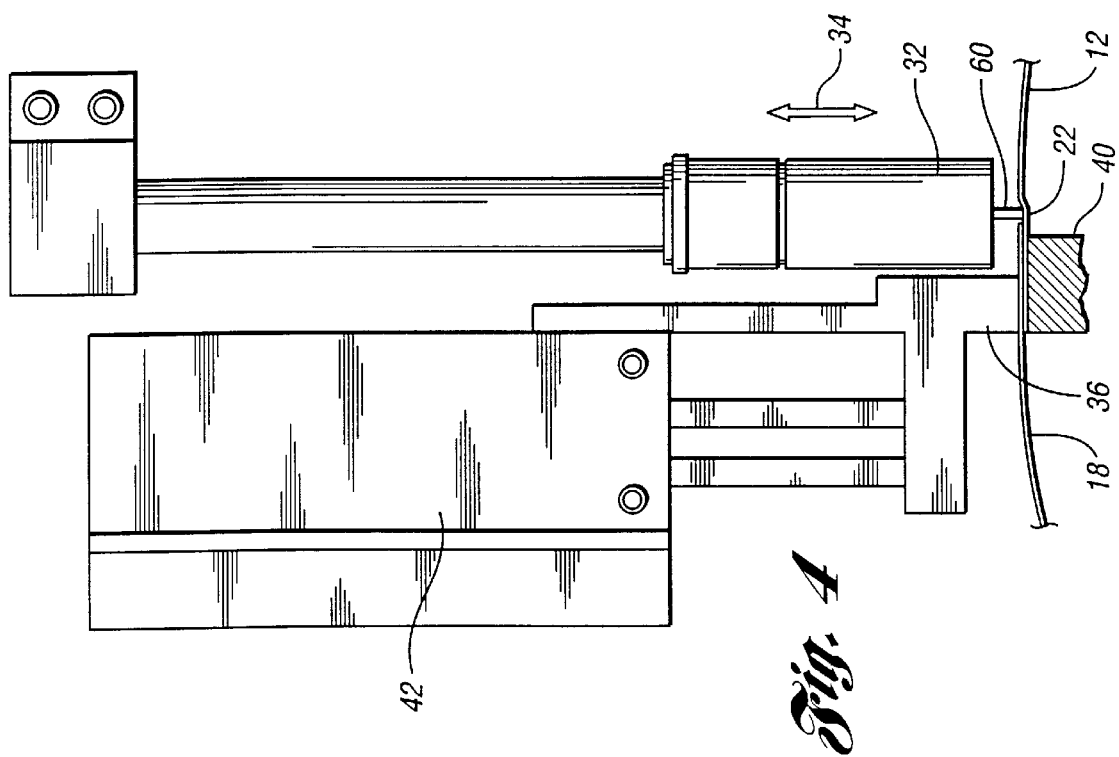
FIG. 5 is a view similar to FIG. 4 but showing the pressure applicator retracted.

After the MIG spot welds have been formed along the joint 22, the pressure applicator 36 is retracted to an inoperative position (FIG. 5). Thereafter, the MIG welding gun is again advanced and moved lengthwise of the joint to apply a linear MIG weld segment 50 between a first two of the MIG spot welds 30. The MIG welding gun 32 is then retracted, moved lengthwise of the joint to the next space between MIG spot welds, advanced toward the joint and moved further lengthwise along the joint to form a linear MIG weld segment 50 in that next space. Following this procedure, linear MIG weld segments 50 are applied between all of the spaces between MIG spot welds, one after another, until a continuous line of MIG welding 52 (FIG. 3) is formed alternately by the MIG spot welds 30 and the linear MIG weld segments 50 and thus completing the welding of the two panels together along the joint.

Finally, the continuous line of MIG welding 52 is polished or abraded to remove irregularities so that the continuous line of MIG welding blends evenly and smoothly with the panels.

Preferably, the MIG welding gun 32 employs a solid wire electrode 60 made of bronze, so that the MIG spot welds 30 and the linear MIG weld segments 50 are bronze.

What is claimed is:

1. A method of welding comprising:

providing a first panel having an edge portion formed with an outer edge, providing a second panel having an edge portion offset from a contiguous inner portion of said second panel to form a shoulder, placing said panels together with the edge portion of said first panel overlying the edge portion of said second panel and with the outer edge of the edge portion of said first panel adjacent to the shoulder of said second panel to provide a joint between said outer edge of said first panel and said shoulder, applying spot welds by metal inert gas (MIG) welding to said panels at spaced points along the joint between said outer edge of said first panel and said shoulder, simultaneously with the application of each of said spot welds applying pressure to press said edge portions of said panels together, and thereafter applying linear MIG weld segments along the joint between the spot welds to form a continuous line of MIG welding.

2. A method as defined in claim 1, wherein the spot welds are made by a movable welding gun, and said pressure is applied by a pressure applicator positioned alongside the welding gun.

3. A method as defined in claim 1, wherein said spot welds are made of bronze and said linear weld segments are made of bronze.

4. A method as defined in claim 1, further including polishing the continuous line of MIG welding along the joint to remove irregularities in the continuous line of MIG welding so that said continuous line of MIG welding blends evenly and smoothly with the panels at said joint.

5. A method as defined in claim 1, wherein the spot welds and linear MIG weld segments are made by a movable bronze MIG welding gun, and further including polishing the continuous line of MIG welding along the joint to remove irregularities in the continuous line of MIG welding so that said continuous line of MIG welding blends evenly with the panels at said joint.

6. A method as defined in claim 1, wherein said spot welds are made of bronze and said continuous linear MIG weld segments are made of bronze and said spot welds and said linear MIG weld segments are made by a movable MIG welding gun, and the pressure to press the edge portions of said panels together simultaneously with the application of each of said spot welds is applied by a pressure applicator positioned alongside said MIG welding gun.

7. A method as defined in claim 6, further including polishing the continuous line of MIG welding along the joint to remove irregularities in the line of MIG welding so that said line of MIG welding blends evenly and smoothly with the panels at said joint.

* * * * *